United States Patent [19]

Stuber

[11] 4,179,630
[45] Dec. 18, 1979

[54] LINEAR COMPRESSOR

[75] Inventor: Richard A. Stuber, Ann Arbor, Mich.

[73] Assignee: Tecumseh Products Company, Tecumseh, Mich.

[21] Appl. No.: 893,873

[22] Filed: Apr. 6, 1978

Related U.S. Application Data

[63] Continuation of Ser. No. 738,708, Nov. 4, 1976, abandoned.

[51] Int. Cl.² .................................................. H02K 33/00
[52] U.S. Cl. .......................................... 310/15; 310/30; 417/416; 417/417
[58] Field of Search ........................ 310/15, 17, 30, 23, 310/29, 34, 35, 19, 90, 216–218; 29/596, 598, 608; 336/68, 5; 417/415–418

[56] References Cited

U.S. PATENT DOCUMENTS

| 3,312,842 | 4/1967 | Heuchling | 310/17 |
| 3,542,495 | 11/1970 | Barthalon | 417/416 |
| 3,788,778 | 1/1974 | Miller | 417/417 |

FOREIGN PATENT DOCUMENTS

| 802700 | 2/1951 | Fed. Rep. of Germany . |
| 1952586 | 4/1971 | Fed. Rep. of Germany . |
| 50202 | 1/1940 | France . |
| 1574145 | 6/1969 | France . |
| 2213561 | 2/1974 | France . |
| 2210855 | 12/1974 | France . |
| 355215 | 9/1973 | Sweden . |
| 392811 | 5/1933 | United Kingdom . |
| 423181 | 1/1935 | United Kingdom . |
| 424095 | 2/1935 | United Kingdom . |
| 629684 | 9/1949 | United Kingdom . |
| 639080 | 6/1950 | United Kingdom . |
| 905095 | 9/1962 | United Kingdom . |
| 925757 | 5/1963 | United Kingdom . |
| 1012718 | 12/1965 | United Kingdom . |
| 1067202 | 5/1967 | United Kingdom . |
| 1129932 | 10/1968 | United Kingdom . |
| 1151554 | 5/1969 | United Kingdom . |
| 1155461 | 6/1969 | United Kingdom . |
| 1248328 | 9/1971 | United Kingdom . |
| 1251596 | 10/1971 | United Kingdom . |
| 1266371 | 3/1972 | United Kingdom . |
| 1270591 | 4/1972 | United Kingdom . |
| 1339817 | 12/1973 | United Kingdom . |

Primary Examiner—Donovan F. Duggan
Attorney, Agent, or Firm—Albert L. Jeffers; John F. Hoffman

[57] ABSTRACT

A moving-iron, linear-motor compressor suitable for use in a refrigerant system, wherein a conical armature reciprocates in a complementary air-gap under the influence of an electromagnetic circuit and a pair of linear (constant rate) complementary return springs connected to the armature between the compressor piston and an outboard bearing. The armature rod is made of magnetically permeable material. The electromagnetic circuit includes a pair of abutting convoluted loops of spirally wound magnetic strip material with a conical air-gap fabricated in the area of abutment. The motor has a layered construction which cooperates with the conical armature and air-gap such that the motor is self-aligning at the assembly stage.

23 Claims, 13 Drawing Figures

LINEAR COMPRESSOR

This is a continuation, of application Ser. No. 738,708, filed Nov. 4, 1976 now abandoned.

This invention relates to reciprocating electric motors of the type in which a magnetically permeable armature is disposed to axially reciprocate within the air-gap of a fixed electromagnetic circuit.

In the art of moving-iron linear-motor compressors, much effort has been expended without having achieved significant commercial success (see P. W. Curwen, "Recent Developments of Oil-Free Linear-Motor Resonant-Piston Compressors," ASME publication 69-FE-36, June, 1969). The linear-motor compressor disclosed herein has been subjected to extensive laboratory testing and the design parameters have been verified through the use of iterative computer programming techniques, and therefore, the requirements of a commercially viable product are believed to have at last been achieved.

It is an object of the present invention to provide a moving-iron linear-motor compressor that is easy and economical to assemble.

It is another object of the present invention to provide a magnetic core for a moving-iron, linear-motor compressor which may be more easily assembled and which has less waste material than a core of conventionally stacked laminations. It is a related object to provide an economical method for manufacturing said magnetic core.

It is an object of the present invention, ancillary to that mentioned immediately above, to provide a magnetic core for a moving-iron linear-motor compressor which is incompressible in the direction of tightening of the compressor tie bolts in order to insure that the tie bolts continue to exert the retention stresses to which they are initially set during assembly to thereby maintain proper alignment of the core, armature and frame of the compressor.

It is yet another object of the present invention to provide a moving-iron, linear-motor compressor which is small in size and which may be easily packaged to suit a wide variety of applications.

It is a further object of the present invention to provide a moving-iron linear-motor compressor in which the twisting forces imparted on the reciprocating armature are reduced substantially to zero.

The present application is an improvement on the linear compressor disclosed in the copending application of Michael K. Bidol Ser. No. 507,539, now U.S. Pat. No. 3,947,155, which has the same filing date as the present application and is assigned to the assignee hereof.

To reduce the twisting forces imparted on the reciprocating armature of the compressor motor, the present invention provides a moving-iron linear-motor compressor wherein the means for returning the armature at the end of its magnetically powered stroke comprises a pair of linear internested coil springs each having substantially zero pitch.

The present invention further provides a moving-iron linear-motor compressor having a magnetic core which includes a pair of abutting convoluted loops of magnetic strip material spirally wound on a plane perpendicular to the compressor axis of reciprocation with the magnetic core air-gap formed in the area of abutment of the two loops.

The novel features which are considered characteristic of the invention are set forth in particular in the appended claims. The invention itself, however, together with additional objects, features and advantages thereof, will be best understood from the following description when read in connection with the accompanying drawings in which:

In the various figures, identical reference numerals indicate identical parts. Referring to FIGS. 1-7, there is shown an exemplary embodiment of a linear-motor compressor 20 constructed pursuant to the disclosure of the aforementioned co-pending Bidol application which is disclosed herein to provide a better understanding of how to make and use the features of the present invention, which are disclosed in detail subsequently herein in conjunction with FIGS. 8-13, and represent modifications to compressor 20. Compressor 20 is suspended within a protective enclosure 21 by the suspension springs 22 which ideally provide a zero retarding force to the axial oscillatory movement of compressor 20 and an infinite retarding force to lateral or radial oscillatory movement thereof. Enclosure 21 is hermetically sealed and may be formed of sheet steel or aluminum or molded plastic, and may assume a shape most convenient for the particular application. Lubricating oil is preferably provided in a sump 23 at the bottom of the enclosure at a depth sufficient to contact the lower portion of compressor 20. The oil will be splashed onto the moving parts by the axial reciprocating action of the motor. Alternatively, the oil may be channeled to lubricated surfaces by other means known in the art.

Figure 2:
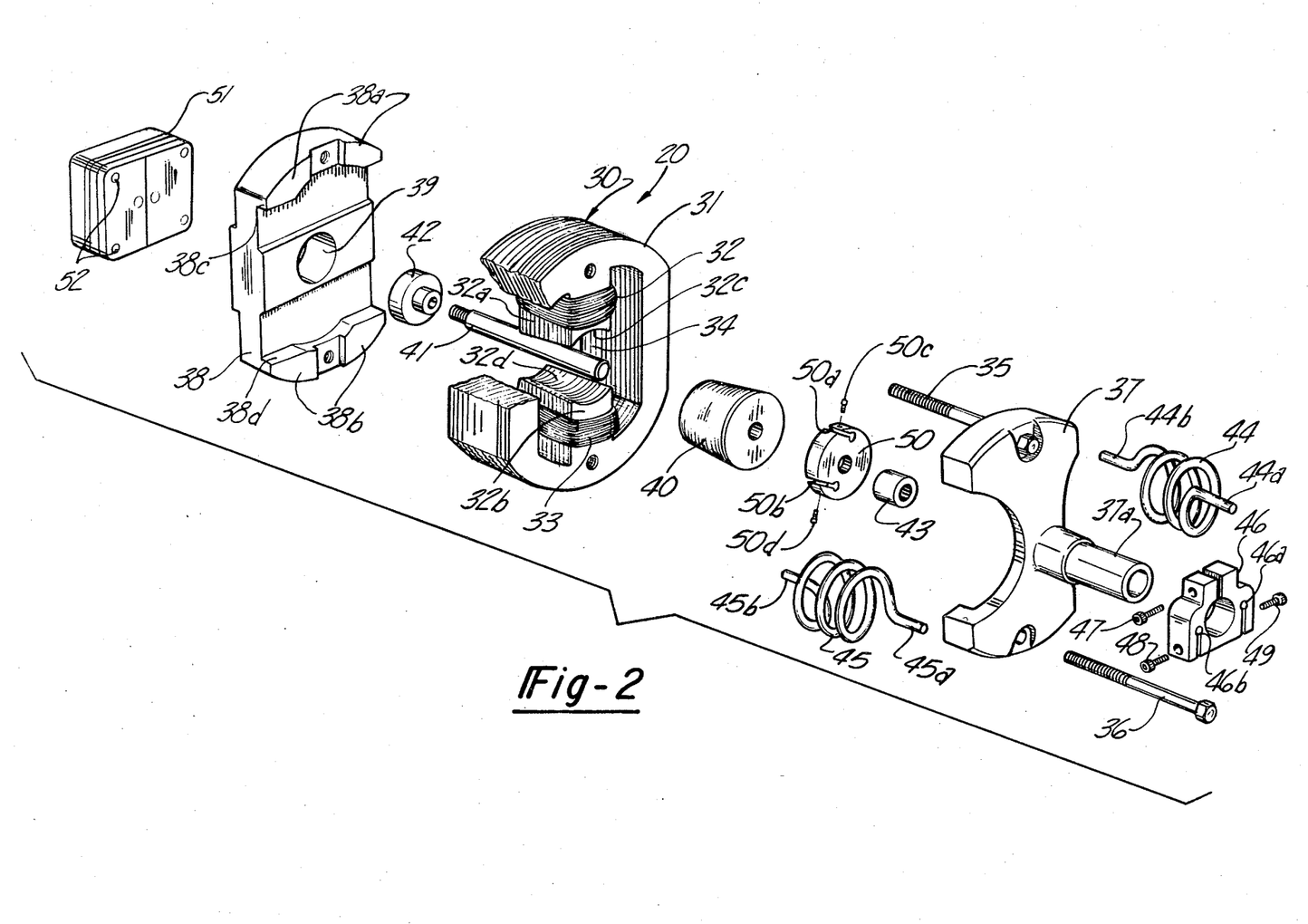
FIG. 2 is an exploded perspective view of the linear compressor motor and gas pump shown in FIG. 1.
Figure 3:
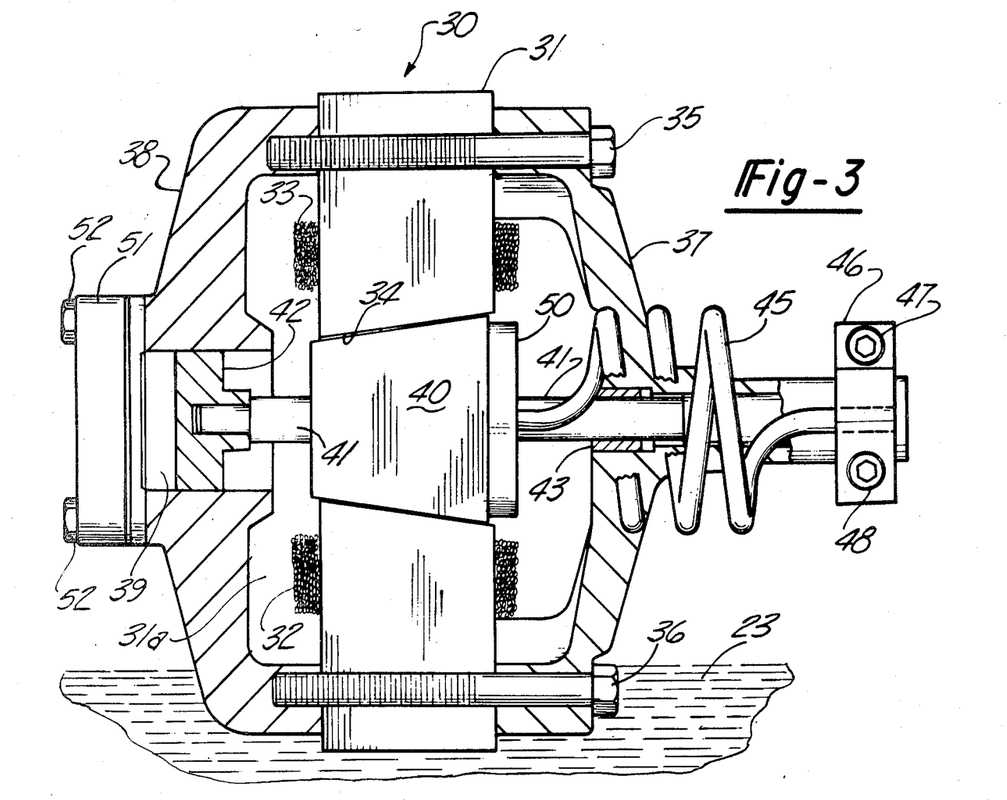
FIG. 3 is an elevational view of the compressor shown in FIG. 1 taken partly in axial section along the line 3—3 of FIG. 1.

The detailed description of compressor 20 may be best understood with reference to FIGS. 2-3. Magnetic circuit 30, which includes magnetic core 31 and windings 32 and 33, has a pair of spaced-apart poles 32a and 32b defining an air-gap 34 with the opposed surfaces or pole faces of poles 32a and 32b defining a portion of a frustoconical surface of revolution. Attached to opposite sides of the magnetic circuit by means of bolts 35 and 36 is an outboard bearing and spring retainer plate 37 and a cylinder block 38 having a pump chamber or cylinder 39 formed therein. As shown in FIG. 3, the taper of air-gap 34 converges in the direction of chamber 39 with the center axis of gap 34 being coaxial with chamber 39.

Movable in air-gap 34 is a frustoconical armature 40 carried by an armature rod 41. Armature 40 may be made of either solid magnetically permeable material or stacked laminations as shown. It has been found that the use of stacked laminations increases the efficiency of the compressor by 15 percent when compared to an identical compressor with a solid magnetic core. Armature rod 41 may be made of nonmagnetic material, such as stainless steel, or, preferably, magnetically permeable material.

Mounted on one end of rod 41 and slidable in chamber 39 is a piston 42. For maximum compression efficiency, the sliding clearance between piston 42 and the side wall of chamber 39 must be small: a nominal clearance of 0.0003 inches is preferred.

Mounted in plate 37 is a sleeve bearing 43 disposed about rod 41 at the end thereof remote from piston 42. Because of the close sliding clearance between piston 42 and the wall of chamber 39, the piston will cooperate with bearing 43 to maintain rod 41 and armature 40 centered in air-gap 34 during axial displacement of the armature, rod and piston.

Slidably mounted on plate 37 and clamping one end of a pair of return springs 44 and 45 is an adjustable clamp bracket 46. Bracket 46 may be tightly clamped to plate 37 by means of screw 47 which is threadably received in a split or slotted offset portion of the clamp. The respective straight end-tang terminations 44a and 45a at the outboard end of springs 44 and 45 are clamped into associated holes 46a and 46b of bracket 46 by means of screws 48 and 49 which traverse associated bracket splits leading to each of the clamp holes. One end of each of return springs 44 and 45 is thus fixedly clamped in relation to magnetic circuit 30 and air-gap 34. The other straight end-tangs 44b and 45b of each return spring 44 and 45 is operatively clamped to armature 40 by means of a spring clamp plate 50 which is mounted on rod 41 against the large diameter face of conical armature 40.

End-tangs 44b and 45b are inserted into associated holes 50a and 50b respectively and clamped therein by means of screws 50c and 50d threadably received into respective split portions of clamp 50. It should be noted that springs 44 and 45 are coiled in the same direction but that each spring enters bracket 46 and clamp 50 from a direction 180° from the direction of entry of the other. In this configuration the bending forces imparted upon armature 40 by the springs during axial reciprocation of the armature tend to cancel each other, thereby assisting bearing 43 and the bearing action of piston 42 to center armature 40 in air-gap 34 during reciprocating axial movement. It should be further noted that end-tangs 44a, 44b and 45a, 45b extend in a direction parallel to the central axis of the springs from the periphery of the respective springs. This feature allows bracket 46 and clamp 50 to assume a reduced diameter, thereby reducing the required dimensions of enclosure 21. While several methods of terminating and affixing springs 44 and 45 will be evident to those skilled in the art, it has been found that the use of straight end-tang terminations 44a, 44b and 45a, 45b on the return springs and the associated split clamp mounting facilitates adjustment and assembly.

Figure 1:
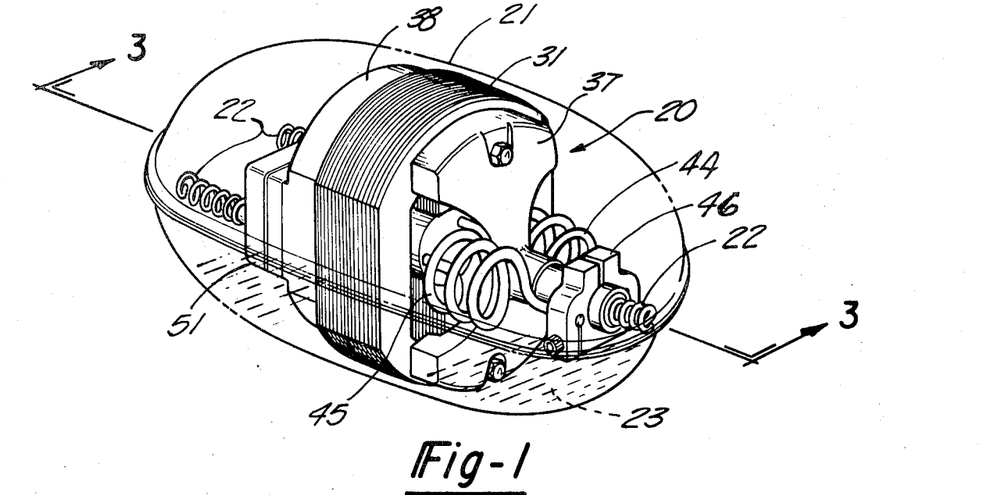
FIG. 1 is a perspective view of one embodiment of the linear-motor compressor hermetically encased within a protective housing in accordance with the present invention.

Compressor 20 is suspended in sump 23 as detailed above with reference to FIG. 1. Because the lateral dimension of block 38, that is, the dimension perpendicular to a line between bolts 35 and 36 and perpendicular to the axis of reciprocation, is less than the corresponding lateral dimension of core 31, which relationship is best seen in FIGS. 1 and 2, and because of the access via side openings provided by the axial spacing of block 38 from core 30 due to mounting pads 38c and 38d (FIG. 2), oil splashed upwardly by the reciprocating action of compressor 20 will enter the chamber 31a (FIG. 3) between core 30 and block 38. Splashed oil which contacts the minor diameter face of armature 34 will be thrust into chamber 39 against the back of piston 42 by the reciprocating action of the armature. This oil will lubricate the sides of chamber 39 in the area of sliding contact with piston 42.

A valve plate and cylinder head assembly 51 is mounted on cylinder block 38 by means of bolts 52. The suction and discharge valves, the valve plate assembly, and the cylinder head may each be any one of the several standard designs known to the art and do not form a part of this invention. In a 450 BTU/Hr working embodiment of compressor 20 to be discussed in detail hereinafter, valve plate assembly 51 is an adaptation of the valve system from a commercially available Model AE Compressor manufactured by Tecumseh Products Company of Tecumseh, Michigan. Valve assembly 51 will not be discussed further except by reference during the discussion of the assembly and operation of the compressor.

Figure 4:
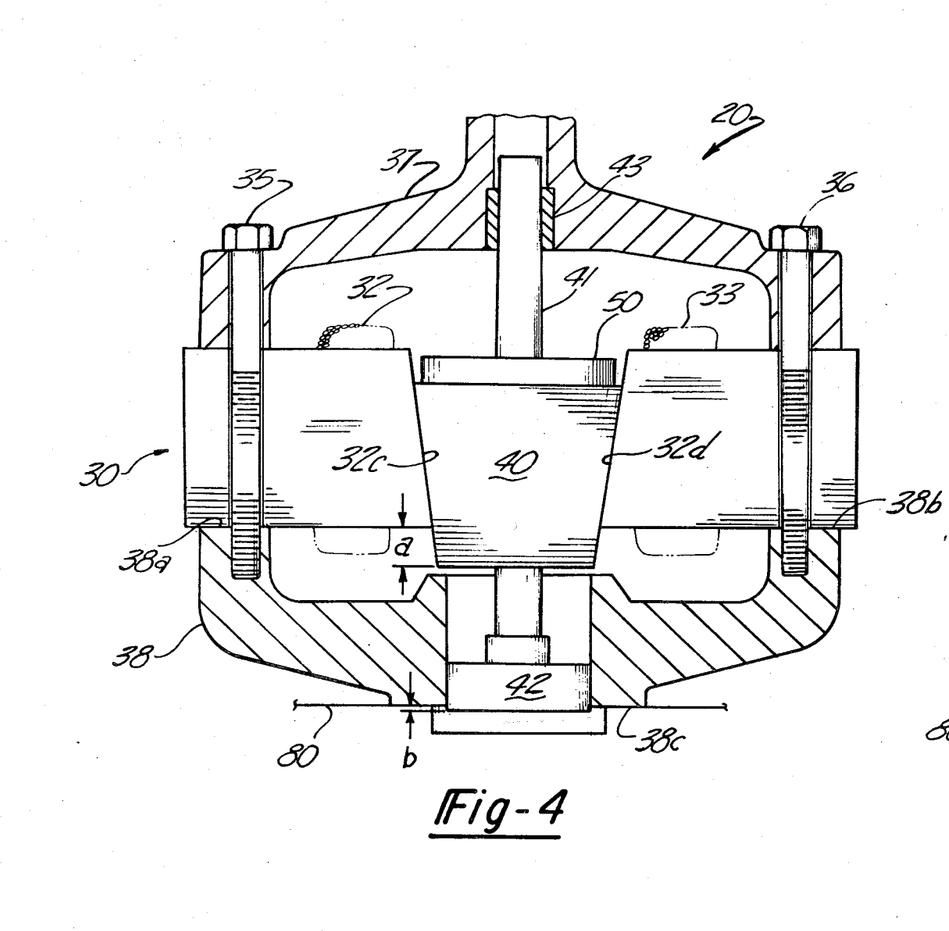
FIG. 4 is an axial sectional view of the compressor shown in FIG. 3 in a stage of partial assembly.

The economical method of assembling compressor 20 may be best understood by reference to FIG. 4 in which compressor 20 is shown being assembled on an assembly surface 80. Cylinder block 38 is first placed head-end down on the assembly surface. Then magnetic circuit 30 is loosely placed on the accurately machined seating surfaces 38a and 38b of block 38 with the respective bolt holes of the core and block roughly aligned. The armature rod assembly, consisting of clamp 50, armature 40 and piston 42 all mounted on armature rod 41, is then seated in the magnetic circuit by being piloted piston-end first into chamber 39 until the piston extends sufficiently into chamber 39 such that the conical armature is seated against the pole faces 32c and 32d which define conical airgap 34. Note in FIG. 4 that in this fully inserted condition piston 42 extends beyond the head-end face 38c of cylinder block 38 by an amount of distance indicated "b" when armature 40 abuts the pole faces. The purpose of this extension will be explained in the discussion of the operation of the compressor motor hereinafter. As the armature is being thus seated, the geometry of the armature and air-gap and the tight tolerance between the piston and chamber wall causes the armature rod assembly to act as a set-up jig which cams core 31 sideways so as to shift it laterally on faces 38a and 38b to thereby automatically center the magnetic circuit and cylinder block with one another and with the armature, rod and piston. The outboard bearing plate 37 and bearing 43 is next mounted on the magnetic circuit, and then bolts 35 and 36 are inserted through plate 37 and core 31 and threaded into block 38, thereby automatically aligning bearing 43 with the common axis of the air-gap and compression chamber and bringing the parts into accurated angular registry. Bolts 35 and 36 may be then tightened down to secure the sub-assembly.

Figure 5:
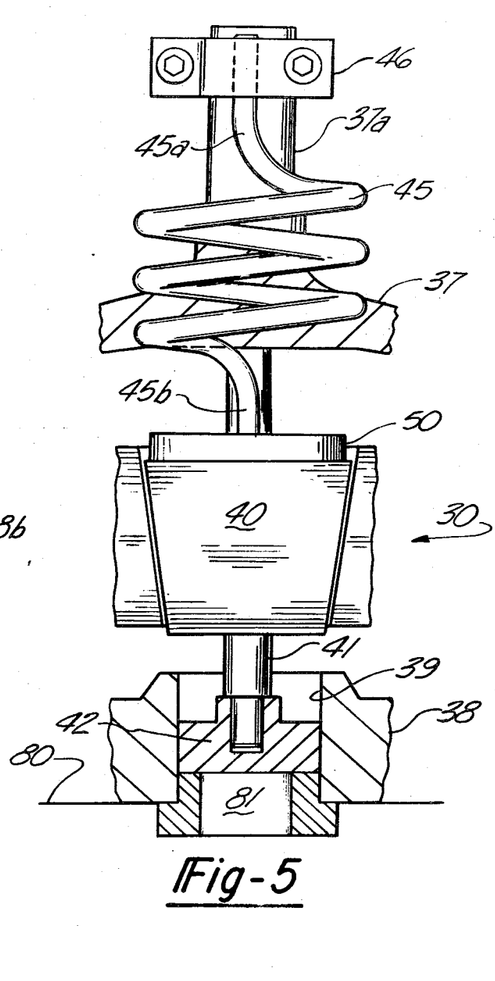
FIG. 5 is a fragmentary axial sectional view of the compressor shown in FIG. 3 in a second stage of partial assembly.

In the next stage of assembly shown in FIG. 5, end-tangs 44a, 44b and 45a, 45b of return springs 44 and 45 are inserted and tightly clamped in adjustable bracket 46 and clamp 50. Bracket 46 at this stage is loosely received on a mounting post 37a of plate 37 so that it can move thereon as piston 42 is raised to rest upon a jig block 81 which is inserted below the piston in the pocket of the assembly surface 80. The piston and armature will then be in the desired rest position, and clamp 46 is then tightly clamped to post 37a after the valve plate and cylinder head assemblies 51 are mounted to the cylinder block, the motor will be ready for operation.

To operate the linear compressor motor, windings 32 and 33 must be connected to a source of alternating current. In the embodiment of the invention illustrated herein, the source of alternating current is half-wave rectified utility power at a frequency of 60 Hz. The motor thus operates at 3600 reciprocations per minute. It is well known in the art that maximum compressor efficiency will be achieved when the resonant frequency of the compressor during normal operation approaches the line frequency of the exciting voltage. Thus, the natural oscillating frequency of the piston, armature, rod and return springs taken together with the normal suction and discharge pressures in the compression chamber should approach 60 Hz. The natural frequency of the return springs together with the rod, piston and armature must, therefore, be less than the frequency of exciting current. In the disclosed embodiment, the natural frequency of the return springs and the rod, piston and armature is preferably substantially equal to 38 Hz.

Figure 6:
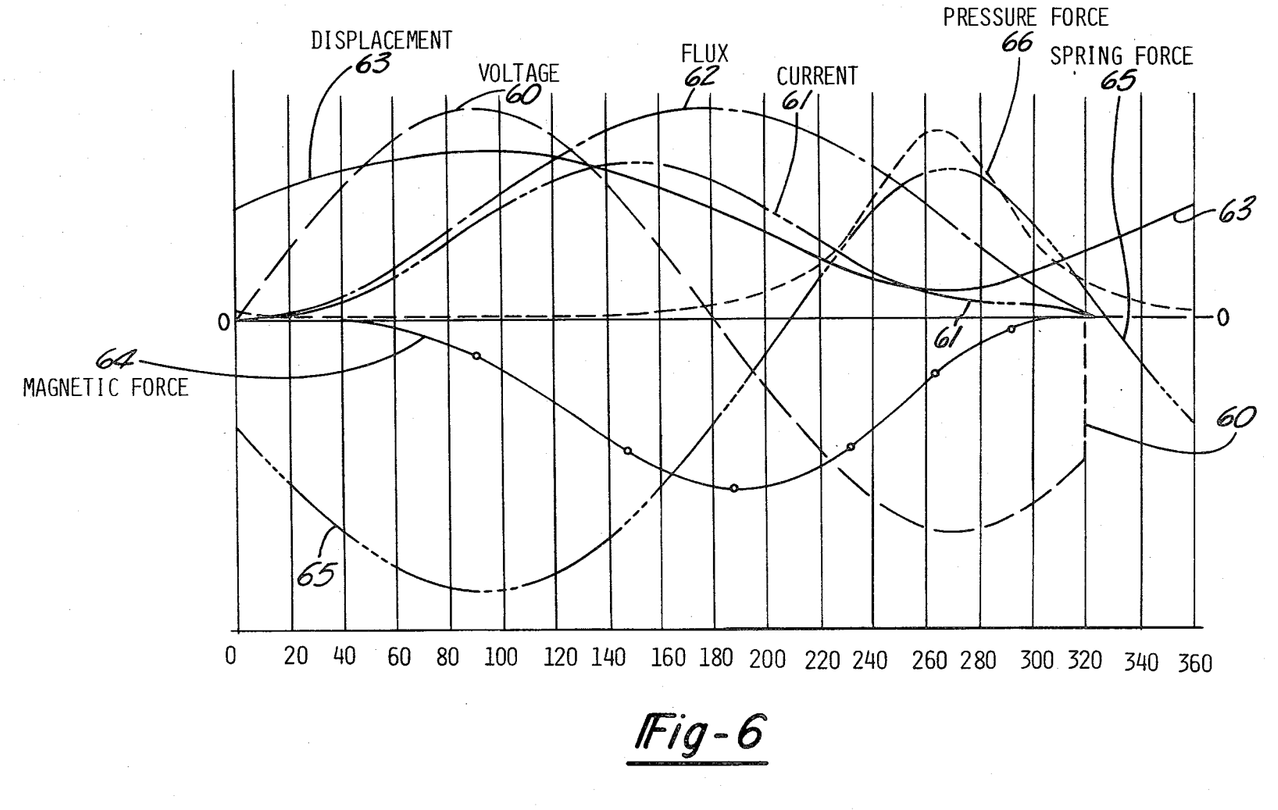
FIG. 6 is a graph used to explain the operation of the compressor shown in FIGS. 1-5.

Operation of compressor 20 may be best understood with reference to FIG. 6 which is a timing diagram depicting the relationships of selected parameters of compressor 20 during one cycle of line voltage. The line voltage 60 describes a substantially sinusoidal pattern over the duration of a 360° cycle time. Because compressor 20 presents an inductive load to line voltage 60, it is to be expected that the current 61 will lag voltage 60 and describe a rectified half wave which is periodic but not sinusoidal. The flux 62 through magnetic circuit 30 follows, but slightly lags, current 61. The ordinates of voltage 60, current 61 and flux 62 are measured in units of volts, amps and kilomaxwells respectively and are not to scale. However, voltage 60, current 61 and flux 62 have a common zero ordinate reference for clarity of understanding. The armature displacement 63 is measured in units of inches with the zero displacement reference being the abutment position of armature 40 against pole faces 32c and 32d which reference position is depicted in FIG. 4. The magnetic force 64 is measured in units of pounds with reference to positive displacement of armature 40. Thus, magnetic force 64 which tends to move armature 40 in a negative direction, that is, a direction toward the zero displacement reference, is shown executing a negative excursion from the zero magnetic reference point. Similarly, spring force 65, which is the force exerted upon armature 40 by springs 44 and 45, and pressure force 66, which is the force exerted on the compression face of piston 42, are measured in units of pounds with reference to a positive axial displacement armature 40; that is, a spring or pressure force which tends to move armature 40 in the direction of positive axial displacement is considered to be a positive force. Magnetic force 64, spring force 65 and pressure force 66 have a common zero ordinate reference for clarity of understanding. The abscissa of FIG. 6 is measured in units of electrical time in degrees of a single cycle of line voltage 60. It should be noted with respect to FIG. 6 that, while the signals shown therein are not to scale, the geometry of each signal is duplicated from test results based upon the 450 BTU/Hr working embodiment to be set forth in detail hereinafter.

In the operation of compressor 20 voltage 60 begins a positive excursion at electrical time zero degrees and induces current 61 in the windings of magnetic circuit 30. Current 61 induces, in turn, flux 62 in core 31 and armature 40. Thus, starting at zero degrees electrical time, magnetic force 64 gradually increases (in the negative direction) and urges armature 40, and therefore piston 42, in the negative displacement direction. It will be noted from FIG. 6 that, at time zero degrees, armature 40 is moving in the positive displacement direction which means that, at the beginning of an electrical cycle, the armature is executing its return stroke, as opposed to its compression stroke, as a result of the momentum imparted to the moving assembly comprising armature 40, rod 41, piston 42 and clamp 50 by return springs 44 and 45 during the preceding electrical cycle. Spring force 65 is negative at time zero degrees indicating that springs 44 and 45 are in compression and exert a force on armature 40 in the negative displacement direction. Thus, shortly after time zero degrees, magnetic force 64 cooperates with spring force 65 to work against the momentum of the assembly to arrest positive displacement thereof and begin movement in the negative direction.

At an electrical time of 90 degrees, displacement 63 has reached its maximum value and the moving assembly has reached its "top dead point" of operation. The assembly will begin to move in the negative direction. As is to be expected, at time 90 degrees spring force 65 has reached its maximum negative or compression value and will begin to move in the positive direction. Magnetic force 64 will continue to increase in a negative direction as current 61 and resulting flux 62 increase. Armature 40 and piston 42 now move in the negative displacement or working direction toward the head-end of pump chamber 39, compressing the gas in chamber 39 to a desired discharge pressure at which the discharge valve will open.

When moving in the negative displacement direction, armature 40 will eventually pass its neutral position so that springs 44 and 45 go into tension and begin to retard further negative displacement of the moving assembly. In FIG. 6 this neutral or zero spring force position is achieved at an electrical time of approximately 208 degrees. It should be noted that at time 208 degrees flux 62 has already passed its maximum point and has begun to decline toward zero.

When magnetic force 64 and the rate of change of momentum of the moving mass 40, 41, 42 and 50 is equal to the sum of spring force 65 exerted on armature 40 by return springs 44 and 45 in tension and pressure force 66 exerted on the face of piston 42 by the compressed gas in chamber 39, positive displacement is arrested and the armature and piston reach their "bottom dead point" of operation. In FIG. 6 this occurs at an electrical time of approximately 265 degrees. It should be noted that at this "bottom dead point" time flux 62 in magnetic circuit 30 is less than half of its maximum value.

Magnetic force 64 will continue to decline after bottom dead point time 265 degrees so that spring force 65 and pressure force 66 govern movement of the armature and piston and return the moving assembly in the positive displacement or return direction. Winding current 61 reaches a zero value at time 320 degrees. Because the current is rectified, voltage 60 returns to zero at this time. The moving assembly comprising armature 40, rod 41, piston 42 and clamp 50 continue motion in the positive displacement or return direction under the influence of pressure force 66 and spring force 65. Positive displacement 63 will continue to increase until the moving assembly reaches its top dead point of operation under the influence of the spring and magnetic forces as outlined above.

In prior linear-motor compressors of the type which include a cylindrical armature and air-gap, the armature is attracted into the air-gap and made to do work until it reaches a point at which its top and bottom end faces are flush with the faces defining the axially opposite ends of the air-gap. At this point, the armature completely fills the air-gap and, since the air space between the armature and pole faces is constant, the reluctance of the total magnetic circuit is at a minimum. The armature can thus be made to do no further work in that cycle. It has apparently been assumed by others in the art that this constraint will also apply to a linear motor having a conical armature and air-gap; this, however, is not the case.

Indeed, maximum compressor efficiency is obtained when the conical armature "fills the air-gap" at the point of maximum flux and, since this maximum flux point will not necessarily occur at the "bottom dead point" of operation, it is advantageous to have the armature continue through the air-gap beyond this flush point. Since the air space between the conical armature and opposing pole faces is no longer constant and is, in fact, a function of axial displacement, the reluctance of the total magnetic circuit will continue to decrease even though part of the armature is moving out of the air-gap.

Returning to FIG. 4, it can be seen that armature 40 extends out of the air-gap a distance "a" when piston 42 extends a distance "b" beyond the end face of cylinder block 38. The flush condition will exist when the minimum diameters of the armature and air-gap are coplanar—i.e., when a=0. It is undesirable to allow armature 40 to strike the pole faces; for this reason, distance "a" is made much larger than distance "b". The piston will thus strike the valve plate before the armature can reach the pole faces, which prevents the armature from striking the pole faces.

Referring to FIG. 6, it will be seen that the "bottom dead point" of operation is achieved at an electrical time of about 265 degrees. At this time flux 62 in magnetic circuit 30 is less than half of its maximum value. Armature 40 is to be positioned on rod 41 so that the armature is flush with pole pieces 32a and 32b at an electrical time of approximately 180°, at which time flux 62 achieves its maximum value. This may be accomplished by modifying the diameter of air-gap 34 vis-a-vis the diameter of armature 40, while maintaining identical included angles of taper, so that, when piston 42 is in the set-up position shown in FIG. 4, armature 40 extends through the air-gap a distance calculated to achieve the desired flush position at the desired time based upon the test results shown in FIG. 6. Referring again to FIG. 4, in the 450 BTU/Hr working embodiment of the compressor, armature 40 is positioned to extend approximately 0.350 inches beyond pole pieces when piston 42 extends 0.030 inches beyond the head-end of cylinder block 38.

The minimum air space between the pole faces and the armature will exist when the piston abuts the valve plate assembly. In the disclosed embodiment this minimum space, that is, the minimum distance from a pole face to the armature as measured in a direction perpendicular to the pole face, is substantially 0.0035 inches. It would, of course, be undesirable to allow the piston to continually strike the valve plate during normal operation. However, as is well known in the art, compression efficiency is optimized when the distance between the piston face and the valve plate approaches zero at the "bottom dead point" of operation. Magnetic force, spring force and compression force must be thus optimized to achieve maximum compression efficiency without allowing the piston to strike the valve plate.

While it has been stated for purposes of explaining the operation of the compressor of FIGS. 1-5 that the armature moves "into" and "out of" the air-gap, it will be appreciated from the discussion immediately above that the armature need not move "entirely out of the air-gap" nor for that matter need "a major portion thereof" be located outside of the air-gap at the "top dead point" of operation, contrary to the disclosures in the U.S. Barthalon Pat. Nos. 3,542,495 and 3,461,806 respectively. Indeed, in the embodiment disclosed herein, which operates at 450 BTU/Hr at standard rating point conditions, the total compression stroke is only 0.8 inches, and the armature exposure at the "top dead point" of operation is less than 50 percent.

When the magnetic circuit reluctance characteristics detailed above have been defined—i.e., a substantially linear reluctance curve over the entire stroke length and an armature flush condition at the time of maximum flux—then the included angle of taper of armature 40 and air-gap 34 may be specified. As stated above, it has been found that, under the above recited conditions, a piston extension dimension "b" of 0.030 inches yields good results. To achieve this dimension, the included angle of taper of the armature and air-gap should be at least 10°, and a range of taper included angles between 10° and 14° is preferred.

The aforementioned Barthalon patents teach that the efficiency of a linear motor will be optimized if the reluctance of the magnetic circuit varies linearly with armature movement. As the aforementioned application of Michael K. Bidol teaches, the stability of a pump which may occasionally operate below atmospheric pressure, such as a refrigeration compressor, will be enhanced if the linear reluctance curve also has a low slope. The various design parameters have been optimized in the present compressor motor to achieve this desired result. While it is not necessary to have the angle of taper of the armature identical to that of the air-gap, it has been found that this condition gives the best overall results. It has also been found that the best results are achieved if the net cross section of the armature, that is, the cross sectional area of the armature taken on a plane through the center of the armature parallel to the axis of movement and excluding the armature rod, is equal to about 80 percent of the effective cross sectional area of the pole piece. The effective cross sectional area of the pole piece is that area taken on a plane parallel to the axis of movement of the armature and perpendicular to the flux through the pole piece. The shape of this cross section should be substantially square rather than rectangular to achieve the minimum winding length per unit of desired flux. The gross cross sectional area of the armature, that is, the cross sectional area of the armature taken as above but including the armature rod, should be greater than the effective cross sectional area of the pole piece. This arrangement yields good results, particularly when an armature rod of magnetically permeable material is used to increase the "magnetic cross section" of the armature.

Figure 7:
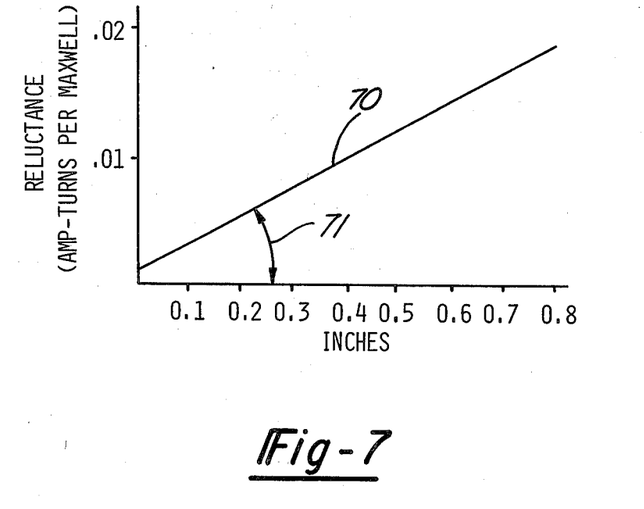
FIG. 7 is a graph of the reluctance curve of one embodiment of the compressor of FIG. 1.

The reluctance curve of the above-mentioned 450 BTU/Hr embodiment is shown in FIG. 7. In the curve 70 of FIG. 7 the abscissa is in inches of displacement as measured from the condition of FIG. 4 when the armature is seated in the magnetic core. The ordinate measurement of reluctance indicates that minimum reluctance at the position of FIG. 4 is approximately 0.001 ampere-turns per maxwell. It has been found that an excessive slope angle 71 is accompanied by frequent impact of piston 42 upon valve plate 51, while an insufficient slope results in loss of mechanical efficiency and a reduced range of conditions for successful operation. It will be noted that reluctance curve 70 is substantially linear over the entire stroke of 0.8 inches and has a slope of approximately 0.022 ampere-turns per maxwell-inch. The parameters of this 450 BTU/Hr working embodiment which contribute to this low-sloped, linear reluctance curve, and the consequent high compressor efficiency, are set forth in the discussion of the working embodiment detailed hereinafter.

Figure 8:
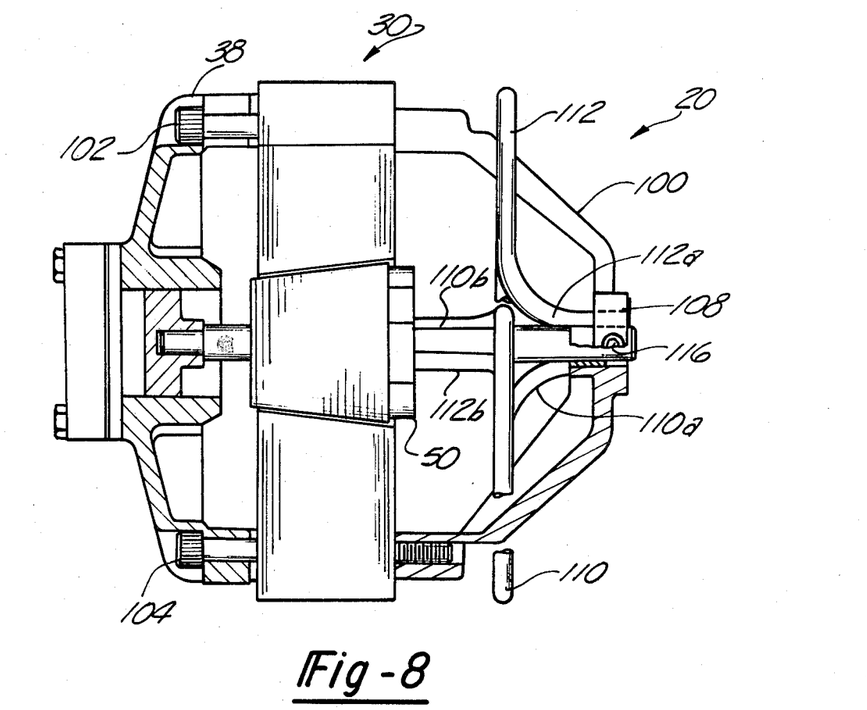
FIG. 8 is a fragmentary axial sectional view of an alternative embodiment of the compressor of FIG. 1 which includes a pair of zero-pitch internesting springs.
Figure 9:
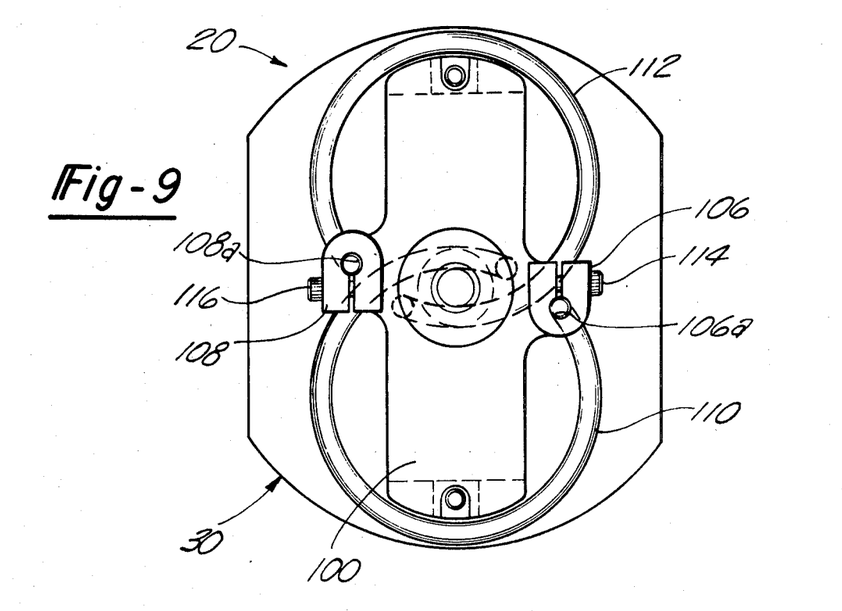
FIG. 9 is an end view of the compressor of FIG. 8 which shows the internested relationship of the springs in greater detail.

An alternative to the three-turn paired spring arrangement in the compressor of FIG. 1 is shown in FIGS. 8 and 9. An outboard bearing and spring retainer plate 100 is clamped to magnetic circuit 30 and cylinder block 38 by the tie bolts 102 and 104. Plate 100 has a pair of spring retainers 106 and 108 each of which fixedly clamps one end of the zero pitch linear springs 110 and 112. Respective straight end-tang terminations 110a and 112a at the outboard end of springs 110 and 112 are clamped into associated holes 106a and 108a of clamps 106 and 108 by means of screws 114 and 116 which traverse associated bracket splits leading to each of the clamp holes. End-tangs 110b and 112b are similarly clamped to armature 40 by means of spring clamp plate 50.

It will be appreciated by those skilled in the art that, depending upon the manufacturing technique used to fabricate the springs, a "zero pitch" spring will have a pitch between zero and the diameter of the spring material. Where straight end-tangs are required, the spring is usually first coiled on a circular mandrel or jig with the end-tangs extending tangentially from the coil. The end-tangs are then bent to positions perpendicular to the plane of the coil. The pitch of the spring thus formed will be substantially equal to zero within some tolerance range which depends upon the resilience of the material used to wind the spring.

There are approximately 0.92 turns of spring material in springs 110 and 112. End-tangs 110a and 110b of spring 110 are thus laterally spaced from each other allowing room for spring 112 to pass therethrough before terminating in clamp 50. Similarly, end-tangs 112a and 112b are spaced to allow passage of spring 110 therebetween, thereby internesting the springs. In this geometry the coils of springs 110 and 112 are aligned with a line connecting tie bolts 102 and 104 rather than being perpendicular therewith and are contained within the lateral perimeter of compressor 20 defined by magnetic circuit 30, thereby reducing the lateral and axial dimensions of the compressor. Furthermore, with the coils of springs 110 and 112 disposed in axial proximity to magnetic circuit 30, housing 21 which encompasses compressor 20 may assume an eliptical shape which is believed to reduce the level of acoustical noise eminating from an operating unit.

The zero pitch internesting springs shown in FIGS. 8 and 9 have the additional advantage of reducing the twisting forces imparted upon armature 40 almost to zero. This reduction in the torsion or twisting forces on the armature and springs results in long spring life and helps maintain armature 40 within air-gap 34 during axial reciprocation thereof.

Figures 10, 11, 12:
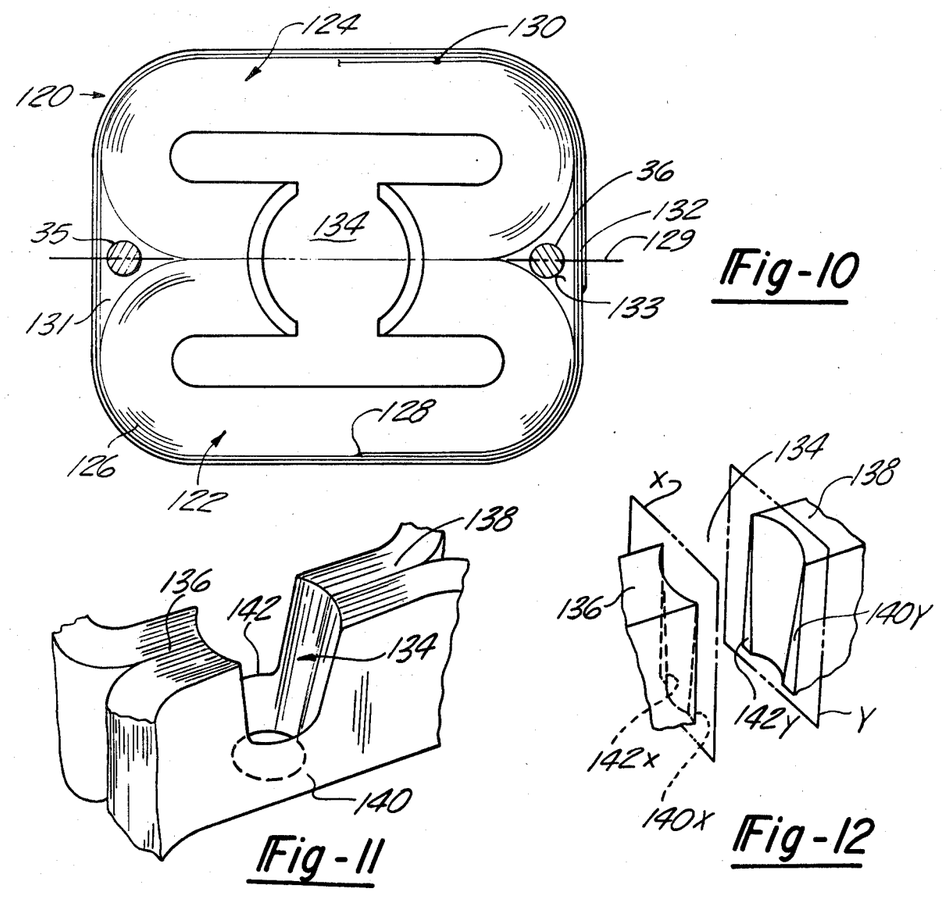
FIG. 10 is a plan view of a modified magnetic core which may be used in the compressor of FIG. 1.
FIG. 11 is a perspective view of the air-gap in the core of FIG. 10 at an intermediate stage of fabrication.
FIG. 12 is a perspective view of the completed air-gap in the core of FIG. 10.

As shown in FIG. 2, magnetic core 31 comprises stacked laminations attached in a manner well known in the art. Alternatively and preferably, the magnetic core may be comprised of first and second inner loops spirally wound of magnetic strip material with the loops placed in abutment and banded together by an outer loop of the same magnetic strip material. Such a core 120 is shown in FIG. 10 and is constructed by first separately winding a pair of identical inner loops 122 and 124 of magnetic strip material to form spiral wrap pattern 126. When loop 122 has reached the desired thickness, the strip material may be terminated and tacked as shown at 128. When loop 124 has reached the desired thickness, the strip material is to be tacked as at 130, but need not be terminated. Loops 122 and 124 are then placed in flat end abutment on plane 129 and the magnetic strip material extending from tack 130, or a separate strip material tacked onto either loop at a convenient attachment point, is wound around the exposed periphery of the dual loop subassembly to form an outer convoluted loop 132 which holds inner loops 122 and 124 tightly together as disclosed in U.S. Pat. No. 2,431,128. Conical air-gap 134 is then machined in the area of abutment of inner loops 122 and 124. Windings 32 and 33 will be wound about the opposing pole pieces and will have magnetic communication carried entirely by the inner loops. For this reason, outer loop 132 may be of any convenient material. The magnetic core shown in FIG. 10 is more easily assembled and has less waste material then stacked lamination core 33.

FIG. 11 is a perspective view of conical air-gap 134 after the air-gap is first machined into the area of abutment of first and second loops 122 and 124. When the minor diameter of gap 134 is less than the width of the core (i.e., the dimension perpendicular to plane 129), then the pole pieces 136 and 138, rather than being isolated from each other, are connected by the magnetic bridges or connections 140 and 142 on either side of the machined gap. In order to prevent a short in the magnetic circuit and to facilitate the mounting of windings 32 and 33 upon pole pieces 136 and 138, connections 140 and 142 must be removed at a second machining stage in the fabrication of magnetic core 120.

FIG. 12 is a perspective view of air-gap 134 in magnetic core 120 after bridges 140 and 142 have been removed. Bridges 140 and 142 have been removed by machining across the faces of pole pieces 136 and 138 in a pair of planes X and Y respectively perpendicular to the central axis of poles 136 and 138 and parallel to but displaced on opposite sides of the axis of reciprocation. When the distance between planes X and Y is less than the maximum diameter of gap 134, this machining will produce in these planes the triangular coplanar exposed gap surfaces 140x, 142x, and 140y, 142y upon opposing faces of pole pieces 136 and 138 respectively. When the gap between planes X and Y is to be only sufficient to allow insertion of windings 32 and 33, a distance between the planes of 16.7 percent of the cross-sectional area of the poles is sufficient.

Figure 13:
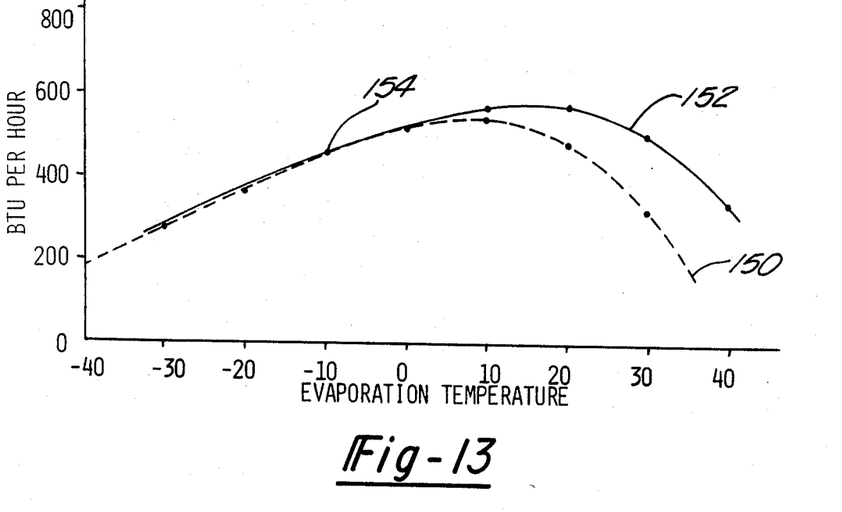
FIG. 13 is a graph used to explain the operation of the modified core shown in FIG. 10.

However, it has been discovered pursuant to the present invention that compressor operation is enhanced when the distance between planes X and Y is increased beyond this 16.7 percent figure. In a specific 450 BTU/Hr working embodiment of the present invention having 1.5 inch-square poles, the distance between planes X and Y was increased to 0.8 inches or approximately 35.5 percent of the cross-sectional area of the poles. This arrangement yielded the results shown in FIG. 13 when compared to a similar 450 BTU/Hr unit with a planar gap of 0.375 inches or 16.7 percent. In FIG. 13 BTU/Hr output is plotted versus evaporation temperature. Dashed curve 150 depicts the output of the 0.375 inch unit over a wide range of evaporation temperatures while curve 152 represents the output of the 0.8 inch unit over the same range. It can be seen that the two units perform equally at rating point conditions—point 154—and perform similarly at evaporation temperatures lower than rating point. However, at higher evaporation temperatures the performance of the 0.375 inch unit falls off much more rapidly than the performance of the 0.8 inch unit. It should be noted that the curves of FIG. 13 were plotted from actual test results and are to scale.

Strip wound core 120 may replace laminated core 31 in compressor 20 of FIG. 2. In this preferred compressor assembly, tie bolts 35 and 36 pass through a pair of substantially triangular apertures 131 and 133 which are formed in the area of abutment of inner loops 122 and 124 and are bounded by the inner loops and outer loop 132 as best seen in FIG. 10. Apertures 131 and 133 afford core 120 a greater degree of lateral "slop" in the assembly stage, thus facilitating the automatic alignment process discussed above with respect to FIG. 4. In addition, since the individual wraps or laminations of core 120 are layered in a direction perpendicular to the axis of reciprocation and to the axes of tie bolts 35 and 36, the retention stresses exerted by the tie bolts are taken edgewise by each wrap instead of parallel to the thickness dimension of each wrap. Hence, the core laminations or wraps are not subjected to bolt forces tending to squeeze them together. Due to this orientation of the bolts parallel to the lateral or width dimension of the wraps, the strip wound core is not compressible in the direction of tightening of the tie bolts. For this reason, it is easier to hold alignment tolerances when core 120 is used.

The material disclosed above with reference to FIGS. 1 to 7, as well as the general concept of fabricating the air-gap as shown in FIGS. 11 and 12, are the subject of the aforementioned application of Michael K. Bidol having the same filing date as the present application and assigned to the assignee hereof. This material is disclosed herein to facilitate understanding of the present invention and because it is the best method presently known for practicing the invention.

Several working embodiments of compressor 20 have been built and tested; one such embodiment is the 450 BTU/Hr (nominal) unit mentioned above and drawn to scale in FIGS. 1–5. By way of example and not by way of limitation, the parameters which contribute to the low-slope linear reluctance curve and the resulting high compressor efficiency at rating point conditions are as follows:

mass of piston 42: 0.17 lbm
mass of armature 40: 0.8 lbm
mass of rod 41: 0.13 lbm
mass of clamp 50: 0.12 lbm
effective mass of springs 44 and 45 ($\frac{1}{3}$ actual mass): 0.08 lbm
rate of springs 44 and 45: 200 lb/in
material of rod 41: 1060 steel
net cross-sectional area of armature 40: 1.76 sq. in.
gross cross-sectional area of armature 40 (and 41): 2.32 sq. in.
effective cross-sectional area of pole pieces 32a and 32b: 2.25 sq. in.
resistance of windings 32 and 33: 2.10 ohms
number of turns in windings 32 and 33: 400
refrigerant suction pressure: 4.4 psig
refrigerant discharge pressure: 180 psig
refrigerant temperature entering compressor housing 90° F.
bore: 1.156 inches dia
flux path area: 2.25 sq. in.

In the working embodiment with the above exemplary parameters, the following results were measured at refrigeration industry standard rating point conditions after 10,000 hours of operation:
capacity: 485 BTU/Hr
power input: 134 watts
efficiency: 3.62 BTU/watt-hour (Weston).

In addition, the following results, which are difficult to accurately measure in a working linear compressor, were calculated from a computer analysis of the 450 BTU/Hr model, the analysis being similar to that set forth above with reference to FIG. 6:
length of stroke: 0.54 in
position of A/C power cycle at "top dead point" of operation: 91 degrees
position of A/C power cycle at flush position: 207 degrees
current at flush position: 4.9 amps
flux at flush position: 213 kilomaxwells
position of A/C power at maximum flux: 180 degrees
current at maximum flux: 7 amps
maximum flux: 231 kilomaxwells
spring force at "top dead point" of operation: −70 lbf
spring force at "bottom dead point" of operation: +38 lbf
position of A/C power at opening of discharge valve: 252 degrees.

As discussed above, reluctance curve 70 at FIG. 7 indicates that this embodiment achieved the objective of having a low-sloped, linear reluctance curve. Furthermore, the above data indicates that the objective of achieving maximum flux at the flush position has been achieved within 8 percent.

From the foregoing description, it will now be apparent that there has been provided, in accordance with the invention, an improved moving-iron linear compressor motor that fully satisfies the objects and advantages set forth above. While the invention has been described in conjunction with specific embodiments thereof, it is evident that many alternatives, modifications, and variations will be apparent to those skilled in the art in light of the foregoing description. It will be further apparent that, while the invention has been disclosed and exemplified in connection with a refrigeration system, the invention is equally applicable to other types of refrigerant systems and that, indeed, many principles of the invention may be applied generally to gas pumps, such as air compressors or the like. Accordingly, the invention is intended to embrace all such alternatives, modifications, and variations as fall within the spirit and broad scope of the appended claims.

What is claimed is:

1. In a moving-iron linear-motor compressor of the type including a gas pump having a pumping chamber, a magnetic circuit fixedly attached to said gas pump and a magnetically permeable armature attached to a pumping member and disposed to axially reciprocate within an air-gap in said magnetic circuit, the improved magnetic core in said magnetic circuit comprising first and second inner convoluted loops spirally wound of magnetic strip material and placed on a common plane perpendicular to the axis of reciprocation of said armature in flatwise abutment on a plane perpendicular to said common plane, means clamping said abutting inner loops tightly together, and means forming said air-gap in the area of flatwise abutment of said inner loops, the central axis of said air-gap being coaxial with said axis of reciprocation.

2. The improved magnetic core set forth in claim 1 wherein said clamping means comprises means wrapped in said common plane about the outer periphery of said first and second inner abutting loops.

3. The improved magnetic core set forth in claim 1 wherein said magnetic core is attached to said gas pump by means passing through said core between said inner abutting loops and said outer loop.

4. The improved magnetic core set forth in claim 1 wherein said air-gap defining means comprises means providing a conical hole coaxially with said axis of reciprocation, and means providing opposing pairs of exposed coplanar gap surfaces, the planes of said surfaces being perpendicular to said plane of abutment but displaced on opposite sides of said axis of reciprocation such that the maximum displacement between said pairs of surfaces is less than the maximum diameter of said conical hole, the space between said pairs of surfaces being devoid of core material.

5. The improved magnetic core set forth in claim 4 wherein said opposing pairs of exposed coplanar surfaces are parallel to each other.

6. The improved magnetic core set forth in claim 5 wherein said maximum displacement is greater than 16.7% of the cross-sectional area of said area of abutment measured in a plane parallel to said pairs of surfaces.

7. The improved magnetic core set forth in claim 6 wherein said maximum displacement is substantially equal to 35.5% of said cross-sectional area.

8. In an electromagnetic compressor of the type including a gas pump having a pumping chamber, a magnetic circuit including means fixedly attached to said pump and having an air-gap, and reciprocating means attached to a pumping member and disposed to axially reciprocate within said air-gap, means for magnetically activating said magnetic circuit to drive said reciprocating means in a first direction, and return means operatively connected to said reciprocating means to drive said reciprocating means in a direction opposite to said first direction, said return means including a pair of parallel coil springs, means clamping one end of each said springs in fixed relation to said magnetic circuit, and means clamping the other end of each said springs to said reciprocating means, the improvement wherein said coil springs comprise a pair of linear coil springs having substantially zero pitch.

9. The improvement set forth in claim 8 for use in a moving-iron linear-motor compressor wherein said reciprocating means comprises a magnetically permeable armature.

10. The improvement set forth in claim 9 wherein each of said springs has less than one coil turn, and wherein the coils of said springs are internested.

11. The improvement set forth in claim 10 wherein each of said internested springs has substantially 0.92 coil turns.

12. In an electromagnetic circuit of the type in which a magnetically permeable armature is disposed to axially reciprocate within an air-gap defined by a pair of spaced-apart, coaxial poles on a fixed magnetic core, said air-gap comprising means providing a first space between said poles, said space having a circular cross section perpendicular to the axis of reciprocation of said armature, and means providing opposing pairs of exposed coplanar gap surfaces, the planes of said surfaces being displaced on opposite sides of said axis of reciprocation such that the maximum displacement between said pairs of surfaces is less than the maximum diameter of said first space, the space between said pairs of surfaces being devoid of core material, the improvement wherein said maximum displacement between said pairs of surfaces is greater than 16.7% of the cross-sectional area of said poles as measured on a plane-parallel to the axis of reciprocation of said armature.

13. The improvement set forth in claim 12 wherein said maximum displacement is substantially equal to 35.5% of said cross-sectional area.

14. The improvement set forth in claim 10 wherein each of said zero-pitch springs has a single convolution at constant equal diameters, said springs being disposed in side-by-side internested relationship between said clamping means and said reciprocating means, axes of said springs being on respectively opposite sides of the axis of reciprocation of said reciprocating means.

15. In an electromagnetic compressor of the type which includes a gas pump having a pumping chamber with a central axis, a magnetic circuit having a magnetic core with an air-gap coaxial with said pumping chamber and means fixedly attaching said magnetic circuit to said pump, said attaching means being oriented to exert retention stresses on said magnetic core in a direction parallel to said central axis, the improvement wherein said magnetic core comprises at least one open loop of magnetic strip material having laminations successively layered one upon another in a direction perpendicular to said central axis such that said magnetic core is substantially incompressible in the direction of said retention stresses, said air-gap being formed between opposed pole faces which define the opening in said open loop.

16. The improvement set forth in claim 15 wherein said magnetic core comprises first and second open convoluted loops of magnetic strip material disposed on a common plane perpendicular to said axis in flatwise abutment in a plane perpendicular to said common plane and means holding said abutting loops tightly together, said air-gap being formed in the area of flatwise abutment by adjacent openings in said open loops.

17. The improved magnetic core set forth in claim 16 wherein said holding means comprises means wrapped in said common plane around the outer periphery of said first and second abutting loops, and wherein said magnetic core is attached to said gas pump by means passing through said core between said abutting loops and said outer loop.

18. The improved magnetic core set forth in claim 16 wherein said air-gap comprises means providing a conical hole coaxially with said central axis and means providing opposing parallel pairs of exposed coplanar gap surfaces, the planes of said surfaces being perpendicular to said plane of abutment and displaced on opposite sides of said axis of reciprocation such that the maximum displacement between said pairs of surfaces is greater than 16.7% of the cross-sectional area of said area of abutment measured in a plane parallel to said pairs of surfaces but less than the maximum diameter of said conical hole, the space between said pairs of surfaces being devoid of core material.

19. The improved magnetic core set forth in claim 16 wherein said maximum displacement is substantially equal to 35.5% of said cross-sectional area.

20. The improved magnetic core set forth in claim 16 wherein said attaching means passes externally of said first and second loops in the area wherein said first and second loops converge upon each other.

21. In a magnetic core adapted for use in an electromagnetic compressor of the type which includes a gas pump having a pumping chamber, a magnetic circuit which includes said core and means fixedly attaching said magnetic core to said pump, said magnetic core having an air-gap with a central axis adapted to be disposed coaxially with said pumping chamber when said core is attached to said pump, said attaching means being oriented to exert retention stresses on said magnetic core in a direction parallel to said central axis, the improvement wherein said magnetic core comprises at least one open loop of magnetic strip material having laminations successively layered one upon another in a direction perpendicular to said central axis such that said magnetic core is substantially incompressible in the direction of said retention stresses, said air-gap being formed between opposed pole faces which define the opening in said open loop.

22. The improved magnetic core set forth in claim 21 wherein said magnetic core comprises first and second open convoluted loops of magnetic strip material disposed on a common plate perpendicular to said central axis in flatwise abutment in a plane perpendicular to said common plane and means holding said abutting loops tightly together, said air-gap being formed in the area of flatwise abutment by adjacent openings in said open loops.

23. In a compressor of the linear action electric motor type including a gas pump having a pumping chamber with a pumping member therein, a reciprocating means attached to said pumping member and disposed to axially reciprocate, magnetic circuit means including means fixedly attached to said pump, means for magnetically activating said magnetic circuit means to drive said reciprocating means in a first direction, and return means operatively connected to said reciprocating means to drive said reciprocating means in a direction opposite to said first direction, said return means including a pair of parallel coil springs, means clamping one end of each of said springs in fixed relation to said magnetic circuit means, and means clamping the other end of each of said springs to said reciprocating means, the improvement wherein said coil springs comprise a pair of linear springs having substantially zero pitch.

* * * * *